(12) United States Patent
Peterson et al.

(10) Patent No.: US 7,494,547 B2
(45) Date of Patent: Feb. 24, 2009

(54) AUTOMATIC VEHICLE WASH AND WAX SYSTEM

(75) Inventors: Ronald Peterson, Tucson, AZ (US); Patrick Charles Secord, Tucson, AZ (US)

(73) Assignee: Car Wash Partners, Inc., Tucson, AZ (US)

( * ) Notice: Subject to any disclaimer, the term of this patent is extended or adjusted under 35 U.S.C. 154(b) by 645 days.

(21) Appl. No.: 10/533,175

(22) PCT Filed: Oct. 31, 2003

(86) PCT No.: PCT/US03/34886

§ 371 (c)(1),
(2), (4) Date: Apr. 29, 2005

(87) PCT Pub. No.: WO2004/039509

PCT Pub. Date: May 13, 2004

(65) Prior Publication Data

US 2006/0011223 A1    Jan. 19, 2006

Related U.S. Application Data

(60) Provisional application No. 60/422,769, filed on Oct. 31, 2002.

(51) Int. Cl.
*B05C 5/02* (2006.01)
*B05D 1/26* (2006.01)

(52) U.S. Cl. ............... 118/315; 118/DIG. 4; 134/123; 134/198

(58) Field of Classification Search ............ 118/313, 118/315, DIG. 4; 427/334, 424; 239/193, 239/208, 209, 282; 222/566, 572; 134/123, 134/198

See application file for complete search history.

(56) References Cited

U.S. PATENT DOCUMENTS

| | | | |
|---|---|---|---|
| 3,079,935 A * | 3/1963 | Padek | 134/45 |
| 3,883,356 A * | 5/1975 | Syrovatka et al. | 106/8 |
| 4,020,857 A | 5/1977 | Rendemonti | |
| 4,288,255 A | 9/1981 | Burger | |
| 4,347,333 A | 8/1982 | Lohr et al. | |
| 4,359,796 A | 11/1982 | Holbus et al. | |
| 4,643,209 A | 2/1987 | Fast | |
| 4,670,500 A | 6/1987 | Gupta | |
| 4,852,199 A | 8/1989 | Holbus | |
| 5,255,695 A | 10/1993 | Downey | |
| 5,266,123 A | 11/1993 | Brand | |
| 5,853,494 A | 12/1998 | Andersson | |
| 6,293,290 B1 | 9/2001 | Bruce | |
| 6,742,720 B2 * | 6/2004 | Nolen | 239/206 |
| 2001/0042797 A1 * | 11/2001 | Shrigley | 239/548 |

FOREIGN PATENT DOCUMENTS

DE    3518298    * 11/1986

* cited by examiner

*Primary Examiner*—Laura Edwards
(74) *Attorney, Agent, or Firm*—Crawford Maunu PLLC

(57) ABSTRACT

A vehicle wash and wax system (10) comprising a liquid coating dispensing station (11) and a waterfall dispensing station (20) to dump a continuous sheet of fluid (25) onto the liquid coating on the surface of the vehicle (30). The waterfall dispensing station (20) has a tank structure (21) with a weir member (32) to form the continuous liquid sheet dump (25). Chemical agents, such as optical brighteners, dyes and a carnauba wax emulsion may be introduced in the waterfall dispensing station (20) for the continuous liquid sheet dump.

18 Claims, 2 Drawing Sheets

AUTOMATIC VEHICLE WASH AND WAX SYSTEM

This application claims the benefit of U.S. Provisional Patent Application No. 60/422,769, filed on Oct. 31, 2002.

BACKGROUND OF THE INVENTION

This invention relates generally to an automatic vehicle wash and wax system. Particularly, the invention relates to a fluid application apparatus and process that is incorporated into an automatic vehicle wash and wax system. More particularly, the invention relates to a fluid dispensing apparatus and process that creates a waterfall for use in the wash and wax operations of an automatic vehicle wash and wax system.

Automatic vehicle washing and waxing operations are typically known to have two general embodiments. In one embodiment, a vehicle is moved by a conveyor structure through successive stations at which various washing and waxing operations take place, such as rinsing, washing, scrubbing, rinsing, waxing and drying. In the second embodiment these same operations are automatically performed on a stationary vehicle while the stations are moved with respect to the vehicle. The present invention may be adapted to both embodiments of these automatic vehicle washing and waxing operations.

A need exists in the automatic vehicle wash and wax system marketplace to effectively apply a coating onto a vehicle surface after the washing cycle. Prior art systems often yield spotty wax or coating applications, as well as wax coatings having a relatively limited effective duration. The automatic vehicle waxing system and process of the present invention provides a uniform and durable protective coating finish for vehicle surfaces.

The automatic vehicle waxing system and process of the present invention may be incorporated into existing automatic vehicle wash and wax operations. One approach of the automatic waxing system of the invention is to provide apparatus and process steps to enhance the effectiveness of the washing and waxing process as well as in the protective coating application on the vehicle surface by utilizing a waterfall dump which includes a carnauba wax emulsion.

SUMMARY OF THE INVENTION

Various example embodiments of the present invention relate to an automatic vehicle wash and wax system and process. The automatic system, subsequent the washing of a vehicle has a spray apparatus which sprays a liquid coating, such as a surface reactive silicone, onto the surface of the vehicle. Adjacent and following the coating spray apparatus, a water sheet application assembly is positioned above the vehicle path and which is constructed and arranged to apply a continuous sheet of a heated liquid waterfall dump onto the vehicle to thereby evenly mix with and disperse the coating composition over the vehicle surface. In some applications, the heated waterfall sheet contains a carnauba wax emulsion and may further contain an opaque dye and/or other chemical agents.

The combination of the heated carnauba wax emulsion and the surface reactive silicones provides a protective barrier and sacrificial coating on a vehicle's painted surfaces. The waterfall application immerses the vehicle in a bath which ensures complete coverage of both visible surfaces and the hard to reach nooks and crannies of the vehicle where paint degradation often begins.

Vehicles are presently provided with clear paint coat finishes comprising polyurethane acrylic polymers which have a positive polarity. The surface reactive silicones, which have a negative polarity, are attracted to the positive polarity of these clear coat polymer surfaces to thereby provide increased adhesion characteristics.

In some example embodiments, the water sheet or waterfall dump application assembly includes a tank structure connected to a heated water or fluid supply. A weir structure is attached to the tank structure for cooperation therewith. The tank structure has a slotted, fluid dispensing pipe which communicates with the fluid supply. The weir structure is attached at a predetermined angle with respect to the tank. The tank/weir combination forms and directs a specified volume of a continuous cascading sheet of heated water or other liquid over the vehicle surface. The weir structure is preferably positioned at an angle of 15-20 degrees with respect to the front of the tank structure. The heated water which is dispensed over the weir structure is preferably in a range of approximately 100-150.degree. F. (38-66.degree. C.). The volume of water spread onto a vehicle via the waterfall dump apparatus preferably ranges from 5-15 gallons (18.9-56.8 liters) per application.

The waterfall dump apparatus of the invention may also be utilized as a rinse application. For example, the waterfall sheet may be applied over a detergent or soap formulation previously sprayed or otherwise applied to the vehicle surface. In some instances, the waterfall dump in this application utilizes cold water.

One or more aspects of the present invention are directed to an improved coating application apparatus and process for use in an automatic vehicle wash and wax operation.

Another aspect of the present invention involves applying a heated liquid waterfall dump onto a vehicle surface to yield an improved protective coating application on the vehicle surface.

Yet another of the invention is directed to a waterfall dump apparatus that may be adapted for use in both the wash and wax operations of an automatic car wash system.

These and other aspects of this invention will become clear from the following description by reference to the drawings.

DESCRIPTION OF EXAMPLE EMBODIMENTS

Referring to FIGS. 1-7, various example embodiments of the present invention relate to an automatic vehicle wash and wax system and process. The automatic system, subsequent the washing of a vehicle has a spray apparatus which sprays a liquid wax or coating onto the surface of the vehicle. In some embodiments, the liquid coating sprayed on the vehicle is a heated surface reactive silicone formulation. Adjacent or following the spray coating apparatus, a water sheet application assembly is positioned above the vehicle path and which is constructed and arranged to apply a continuous sheet of a heated liquid waterfall dump onto the vehicle to thereby evenly mix with and disperse the coating composition over the vehicle surface. The waterfall dump apparatus may also be utilized as a rinse application subsequent a soap or detergent application in the wash cycle.

In some embodiments, the waterfall sheet contains a carnauba wax emulsion and may further contain an opaque dye, and which may be colored, i.e., green or other color. The water or fluid sheet or waterfall application assembly includes a tank structure connected to a heated water supply. Cold water is preferred when the waterfall is used subsequent a wash cycle. A weir structure is attached to the tank structure having a fluid dispensing pipe therein. The weir structure is attached at a predetermined angle with respect to the tank. The tank/weir combination forms and directs a specified volume of a continuous cascading sheet of heated water or other liquid over the coated vehicle surface. In some applications, the weir structure is positioned at an angle of 15-20 degrees with respect to the front of the tank structure. In some implementations, the heated water which is dispensed over the weir structure is in a range of approximately 100-150.degree. F. (38-66.degree. C.), so that the carnauba wax emulsion is applied in this temperature range. The volume of water spread onto a vehicle via the waterfall or fluid fall dump ranges from 5-15 gallons (18.9-56.8 liters) per application for some implementations, and which may involve a 20-35 second waterfall application.

Other waterfall dump apparatus may also be utilized within the purview of this invention. Thus, instead of using a tank/weir combination, other fluid dispensing structures may be utilized to form a continuous fluid sheet. For example, a slotted dispensing conduit or other known apparatus may be used to produce a continuous liquid sheet for use in the wash, wax and rinse operations of the invention.

The waterfall dump apparatus of the invention may also be utilized as a rinse application. For example, the waterfall sheet may be applied over a detergent or soap formulation previously sprayed or otherwise applied to the vehicle surface. Preferably, the waterfall dump in this application would utilize cold water.

Figure 1:
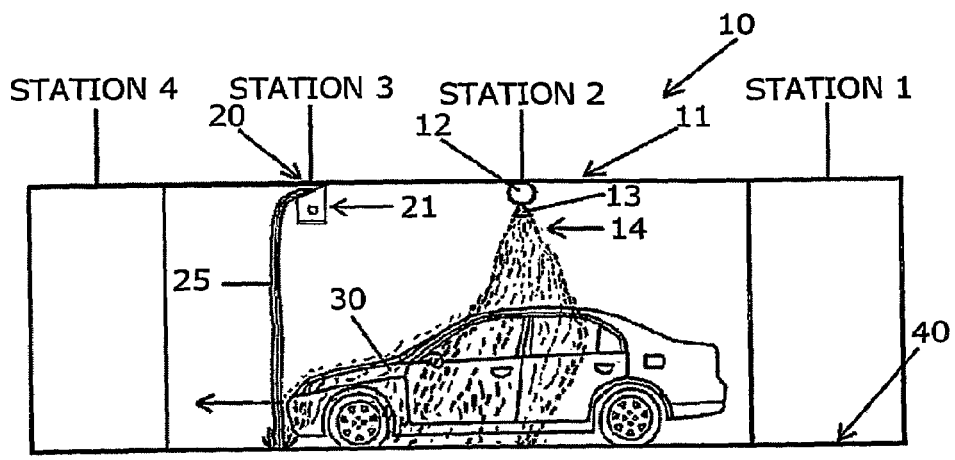
FIG. 1 is a lateral plan view showing a vehicle wash and wax system, according to an example embodiment of the present invention.
Figure 2:
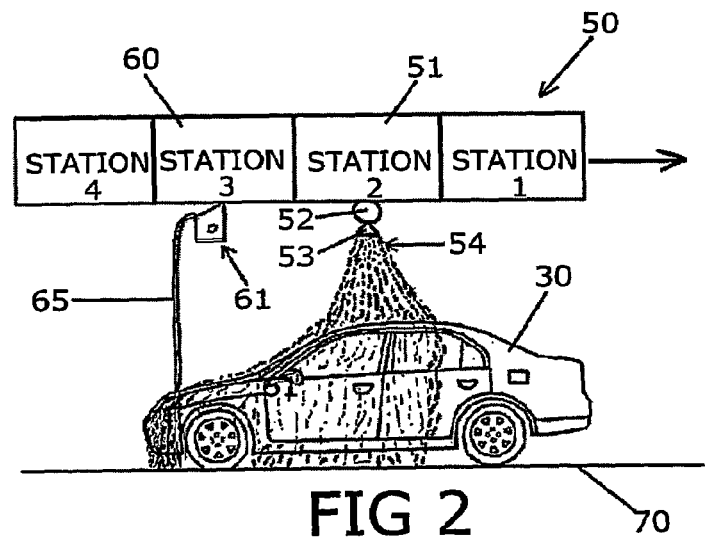
FIG. 2 is a lateral plan view showing another embodiment of the wash and wax system of the present invention.

Referring to FIGS. 1 and 2, two types of vehicle wash and wax systems are shown, namely, systems 10 and 50. Each system is shown to have Stations 1, 2, 3 and 4. Station 1 may comprise a vehicle pre-rinse, wheel rinse, a soak, a wash and a rinse application, and which may include the use of brushes and wiping members. Station 2 may comprise a wax or coating application assembly, i.e., a wax spray application, or a silicone coating formulation. Station 3 comprises a wax/rinse application assembly and Station 4 may comprise a spot free rinse and/or blow dryer application assembly. The focus of the present invention is the combination of the functions of Stations 2 and 3, and particularly the apparatus of Station 3. Further, the assembly and process of the invention may also be used in connection with the wash cycle of Station 1. In FIG. 1, Stations 1-4 are shown to be stationary and wherein the vehicle moves with respect to the stations. In FIG. 2, the vehicle is shown to be stationary and Stations 1-4 are shown to move with respect to the vehicle. With respect to both FIGS. 1 and 2, Stations 2 and 3 are shown spatially separated; however, they may also be positioned directly adjacent to each other.

Referring to FIG. 1, the vehicle wash and wax system 10 is shown to have Stations 1, 2, 3 and 4 and which are shown sequentially disposed with respect to vehicle 30. The vehicle 30 is shown to move by means of a moving track 40, i.e., a conveyor, as indicated by the arrow adjacent the vehicle 30. In Stations 1 and 4, various washing, rinsing and drying operations may occur as desired, including the utilization of spray jets positioned above, below and on the sides of vehicle 30. These stations may further utilize brushes and other vehicle contact and wiping devices as desired. The system of the present invention is the combination of the functions yielded by the apparatus Stations 2 and 3.

As particularly shown in FIG. 1, Station 2 comprises a wax or coating dispensing apparatus 11 having a spray bar or rain bar structure. A liquid wax or coating delivery pipe 12 with nozzle 13 is shown producing a spray coating 14 which is directed onto the outer surfaces of vehicle 30 moving below. Preferably, the spray coating is a surface reactive silicone formulation. Delivery pipe 12 is in communication with a liquid wax or coating source (not shown) and may have a plurality of nozzles 13, i.e., 4-6 spray heads, so that the entire surface of the vehicle is covered as it passes through Station 2.

Importantly, Station 3 is shown to comprise a waterfall dispensing apparatus 20 having a tank or pan structure 21 having a weir structure which causes a continuous sheet of liquid, i.e., a heated waterfall or water having desired chemical agents and/or a wax or coating formulation, to be dispensed onto the wax deposited surface of vehicle 30 as it travels through Station 3. It is preferred that a carnauba wax emulsion is injected into the heated waterfall. The waterfall sheet or continuous fluid dump 25 provides total contact with the spray coat layer, i.e., a surface reactive silicone that is previously placed on the surface of vehicle 30 in adjacent Station 2, for example. In addition or alternatively, the continuous fluid dump 25 may be poured over the soap application used in prior art applications. The waterfall dump causes the wax or coating spray or other previous liquid application to be dissolved, mixed and/or evenly spread over the vehicle surface.

Referring to FIG. 2, generally the same process as described above with respect to FIG. 1, is utilized on stationary vehicle 30 which sits on floor 70. Stations 1-4 are shown to move with respect to vehicle 30. Alternatively, Stations 1 and 4 may be stationary as described with respect to FIG. 1, and Stations 2 and 3 being the only moving stations. As particularly shown, the vehicle wash and wax system 50 is comprised of a coating dispensing apparatus 51 (Station 2) having a liquid wax or coating delivery pipe 52 and spray nozzles 53 producing a spray coating 54 for placement on the surface of vehicle 30. A waterfall dispensing system 60 is shown in Station 3 and is shown comprised of a tank or pan structure 61 having a weir structure which produces a continuous waterfall liquid sheet 65.

Figure 3:
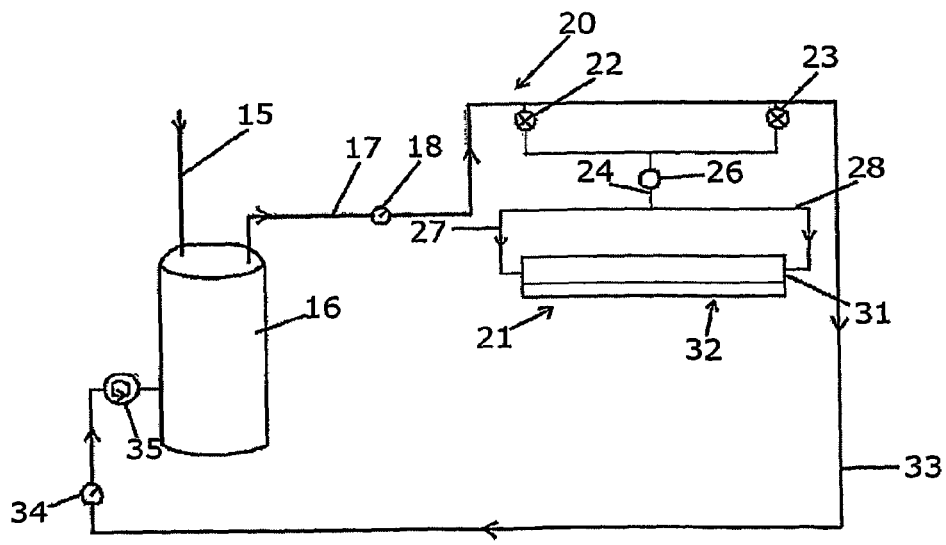
FIG. 3 is a schematic showing a waterfall dump station used in a vehicle wash and wax system, according to another example embodiment of the invention.

Referring to FIG. 3, the waterfall dispensing apparatus 20 is schematically shown comprised of a cold water supply 15 which is connected to water heater 16, i.e., a 75 gallon, 75,000 BTU water heater. Hot water is shown flowing through piping 17, i.e., one inch copper piping to a junction having valves 22 and 23, i.e., one inch valves. Although shown having two valves 22 and 23, one valve may instead be used. A chemical injector 26 is shown connected to pipe 24 which may be directly connected to the single valve, and which permits chemical agents such as the carnauba wax emulsions, optical brighteners and dyes to be introduced into the waterfall dump. Supply pipes or hoses 27 and 28 are shown connected to the opposite sides of pan or fluid tank structure 21, which is comprised of holding pan or tank structure 31 and a connected weir structure 32. Return piping 33, i.e., one inch diameter piping or hosing, is shown connected to water heater 16 to provide a closed fluid loop and which is shown driven by circulating pump 35, which maintains a desired fluid pressure. Temperature gauges 18 and 34 are shown disposed in the piping system to measure fluid temperatures leaving and entering the water heater 16. The water or fluid dispensed by the waterfall dispensing apparatus 20 is preferably within a range of approximately 100-150° F. (38-66° C.), and specifically within a preferred range of approximately 130-140° F. (54-60° C.). An approximate temperature of 140° F. (60° C.) has been found preferred in the vehicle waxing system of the present invention, whereby the carnauba wax emulsion is applied as a waterfall dump in the approximate 100-150° F. (38-66° C.) temperature range.

As shown in FIGS. 4-7, the fluid hold pan or tank structure 31 has a generally trapezoidal configuration. The pan structure 31 is preferably constructed of stainless steel, i.e., 12 gauge, 304 stainless steel. The pan structure may, however, be formed of a like or other suitable material. Mounting plates 36 and 37 are shown extending from the pan structure 31 and may contain mounting holes or a like structure to secure the pan structure 31 in the waterfall or water sheet application apparatus. Studs 44 are shown extending from the front of the pan structure 31 to receive the weir member 32. Specifically, the weir member 32 has a mounting panel 41 with mounting apertures 43 which align with the studs 44 of the pan structure 31. Connecting nuts 49 or other securement means may be utilized to secure the weir member 32 to the pan structure 31, and other means may be utilized to form the weir structure.

Figure 4:
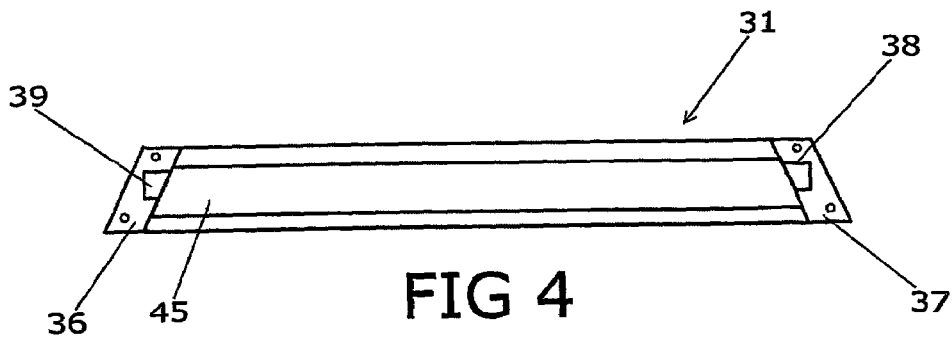
FIG. 4 is a top view of the tank structure used in the waterfall dump station of FIG. 3.
Figure 5:
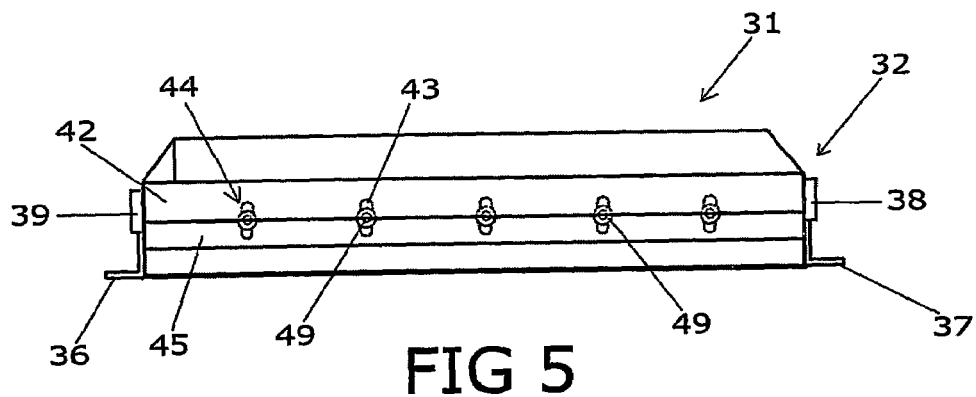
FIG. 5 is a frontal view of the tank structure, according to another example embodiment of the invention.
Figure 6:
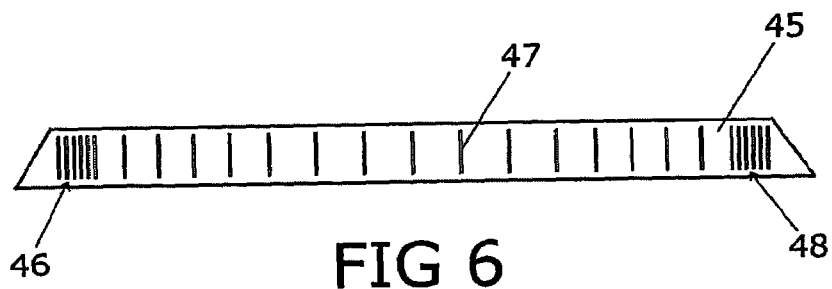
FIG. 6 is a bottom view of the supply pipe used in the pan structure of FIG. 3.

The pan structure 31 is shown in FIG. 4 to have a trapezoidal configuration when viewed from the top. For example, the length at the rear of the pan structure 31 may be approximately 72 inches (182.9 cm) whereas the front may be approximately 76 inches (193 cm). The width of the pan structure 31 may be approximately 3.75 inches (9.53 cm) and the depth may be approximately 4 inches (10.2 cm) at the front and approximately 6 inches (15.24 cm) at the rear. As shown particularly in FIGS. 4 and 6, a dispensing pipe 45 is mounted within the interior of the pan structure 31. The dispensing pipe 45 may be an approximately 3 inch (7.62 cm) diameter PVC pipe having a plurality of slots or openings 46, 47 and 48 for filling the pan structure 31 to form the waterfall sheet. The dispensing pipe 45 is shown connected to couplings 38 and 39 which connect to piping 27 and 28. These dimensions and compositions are exemplary.

Figure 7:
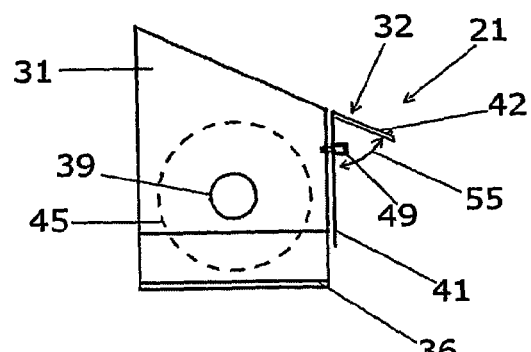
FIG. 7 is a lateral view of the pan and weir structures of FIGS. 3 and 6, respectively.

Importantly, the weir member 32 has a top panel 42 which is disposed at a predetermined angle, designated by numeral 55 in FIG. 7, and which aligns with the top front of the pan structure 31. The dispensing pipe 45 is positioned within the interior of the pan structure 31 and is connected to couplings 38 and 39. The bottom side of the dispensing pipe 45 is shown to have a series of slots or openings in series or groups, i.e. 46, 47 and 48, which permit fluid to be introduced into the pan structure 31. The slots may have a 0.135 inch (0.343 cm) wide opening and spaced apart 1 inch (end slot groups 46 and 48) and 4 inches (slots 47), for example. The coating dispensing apparatus 11 having nozzles 13 for spraying the surface reactive silicone may be mounted to the rear of the pan structure 31, for example.

Other waterfall dump apparatus may also be utilized within the purview of this invention. Thus, instead of using a tank/weir member combination, other fluid dispensing structures may be utilized to form a continuous fluid sheet. For example, a slotted dispensing conduit or other known apparatus may be used to produce a continuous liquid sheet for use in the wash, wax and rinse operations of the invention.

As discussed herein, the fluid dispensing apparatus, such as the waterfall dump, produces a continuous liquid sheet the approximate width of a vehicle, i.e., 6 feet (1.83 meters), and dumps approximately 5-15 gallons (18.93-56.8 liters) of fluid per application, preferably approximately 11 gallons (41.6 L) of fluid per application. The continuous fluid sheet is preferably dumped over the entire vehicle, bumper to bumper, and may be activated in one embodiment by a pressure plate, photo eye, trip gate or other activation means. For example, the activation means may activate the circulation pump of FIG. 3 to cause the fluid in the tank to spill over the weir structure and to thereby produce the fluid sheet or waterfall dump.

As many changes are possible to the embodiments of this invention, utilizing the teachings thereof, the description above and the accompanying drawings should be interpreted in the illustrative and not the limited sense.

That which is claimed is:

1. A vehicle washing system comprising:
    a) a coating application apparatus constructed and arranged to apply a coating formulation onto a vehicle; and
    b) a water sheet application apparatus constructed and arranged to apply a continuous sheet of water onto the coating formulation applied to the vehicle to create a coating solution and to evenly disperse the coating formulation on the vehicle, the water sheet application apparatus including a chemical injection device to inject a carnauba wax emulsion into a water supply for said continuous sheet of water.

2. The vehicle washing system of claim 1, wherein said coating application apparatus has a surface reactive silicone spray dispenser.

3. The vehicle washing system of claim 1, wherein the water sheet application apparatus applies a continuous sheet of unheated water onto the coating applied to the vehicle.

4. The vehicle washing system of claim 1, wherein a lowermost portion of the water sheet application apparatus is arranged above the vehicle onto which the water sheet is to be applied, and wherein the water sheet application apparatus applies the continuous sheet of water by dropping the water from a position above the vehicle, allowing the sheet of water to fall freely onto the vehicle.

5. The vehicle washing system of claim 1, wherein the water sheet application apparatus includes a dispensing conduit arranged above the vehicle to drop water directly onto the vehicle to apply the continuous sheet of water onto the coating applied to the vehicle.

6. The vehicle washing system of claim 1, wherein the water sheet application apparatus applies the sheet of water onto the coating formulation to create a coating solution by mixing the sheet of water with the coating formulation.

7. The vehicle washing system of claim 1, wherein the water sheet application apparatus applies the sheet of water onto the coating formulation to create a coating solution by causing the coating solution to dissolve.

8. The vehicle washing system of claim 1, wherein the water sheet application apparatus includes:
    a liquid tank;
    a water supply to supply water to the tank;
    a wax supply to supply wax to the liquid tank; and
    wherein the water sheet application apparatus is adapted to apply a sheet of liquid solution including water and wax onto a vehicle beneath the liquid sheet application arrangement.

9. The vehicle washing system of claim 8, wherein the water sheet application apparatus applies the sheet of liquid solution to create a coating solution with a coating material on the vehicle, and to disperse the coating material on the vehicle.

10. The vehicle washing system of claim 8, wherein the coating application apparatus is adapted to apply a coating material to the vehicle, prior to application of the sheet of liquid solution, wherein the water sheet application apparatus applies the sheet of liquid solution to create a coating solution with a coating material on the vehicle, and to disperse the coating material on the vehicle.

11. The vehicle washing system of claim 8, wherein the water sheet application apparatus is adapted to apply a sheet of liquid solution including water and wax onto a vehicle beneath the water sheet application arrangement by releasing the sheet of liquid solution from a position above the entire vehicle, allowing the sheet of liquid solution to drop freely from the liquid sheet application arrangement to the vehicle via gravity.

12. A vehicle washing system comprising:
   a) a coating application apparatus constructed and arranged to apply a coating formulation onto a vehicle; and
   b) a water sheet application apparatus constructed and arranged to apply a sheet of water onto the coating formulation applied to the vehicle to create a coating solution and to evenly disperse the coating formulation on the vehicle, the water sheet application apparatus including a tank structure, a water supply and a weir attached to said tank structure.

13. The vehicle washing system of claim 12, wherein said water sheet application apparatus further includes a water heater for providing to said tank structure water heated to a range of approximately 100-150° F. (38-66° C.).

14. The vehicle washing system of claim 12, wherein said weir is disposed at angle range between 15 and 20° with respect to a horizontal plane and wherein said water sheet application apparatus dispenses between 5 to 15 gallons (18.9-56.8 liters) of water per application.

15. The vehicle washing system of claim 12, wherein said tank has opposing sides and wherein a water inlet is disposed in each said side.

16. The vehicle washing system of claim 15, wherein a pipe extends between said opposing sides within said tank and wherein said pipe has a plurality of slots spaced in the bottom thereof.

17. The vehicle washing system of claim 16, wherein said tank has a trapezoidal cross-sectional configuration.

18. A vehicle washing system comprising:
   a )a coating application apparatus constructed and arranged to apply a coating formulation onto a vehicle; and
   b) a water sheet application apparatus constructed and arranged to apply a continuous sheet of water onto the coating formulation applied to the vehicle to create a coating solution and to evenly disperse the coating formulation on the vehicle, the water sheet application apparatus including a chemical injection device to inject a surfactant, a dye and an optical brightening agent into a water supply for said continuous sheet of water.

* * * * *